United States Patent
Phillips

(10) Patent No.: US 8,509,811 B2
(45) Date of Patent: Aug. 13, 2013

(54) SERVICE PROVIDER RECOMMENDATION ENGINE

(75) Inventor: Derek Phillips, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,232

(22) Filed: Sep. 29, 2011

(65) Prior Publication Data

US 2012/0021775 A1     Jan. 26, 2012

Related U.S. Application Data

(63) Continuation of application No. 12/757,784, filed on Apr. 9, 2010.

(60) Provisional application No. 61/306,821, filed on Feb. 22, 2010.

(51) Int. Cl.
*H04W 24/00*     (2009.01)

(52) U.S. Cl.
USPC ........................................... 455/456.1

(58) Field of Classification Search
USPC ............... 455/404.2, 405, 424, 434, 414.1, 455/423, 446, 452.2, 456.1, 456.3; 706/45, 706/46, 47; 705/7.34
See application file for complete search history.

(56) References Cited

U.S. PATENT DOCUMENTS

| | | | |
|---|---|---|---|
| 6,317,401 B1 | 11/2001 | Masaki et al. | |
| 6,433,734 B1 | 8/2002 | Krasner | |
| 6,463,290 B1 | 10/2002 | Stilp et al. | |
| 6,546,256 B1 | 4/2003 | Maloney et al. | |
| 6,597,908 B1 | 7/2003 | Yu | |
| 6,757,543 B2 | 6/2004 | Moran et al. | |
| 6,904,026 B1 | 6/2005 | Tarnanen et al. | |
| 6,973,622 B1 | 12/2005 | Rappaport et al. | |
| 7,079,844 B2 | 7/2006 | Furukawa et al. | |
| 7,099,921 B1 * | 8/2006 | Engstrom et al. | 709/206 |
| 7,280,803 B2 | 10/2007 | Nelson | |
| 7,392,017 B2 | 6/2008 | Chu et al. | |
| 2003/0190917 A1 | 10/2003 | De Cambray-Mathan | |
| 2005/0260982 A1 | 11/2005 | Ko et al. | |
| 2006/0227718 A1 | 10/2006 | Wang et al. | |
| 2006/0258295 A1 | 11/2006 | Wong et al. | |
| 2007/0004394 A1 | 1/2007 | Chu et al. | |

(Continued)

OTHER PUBLICATIONS

International Search Report and Written Opinion of international application No. PCT/US20111024755, dated Nov. 17, 2011, 13 pp.

(Continued)

*Primary Examiner* — George Eng
*Assistant Examiner* — Hung Du
(74) *Attorney, Agent, or Firm* — Shumaker & Sieffert, P.A.

(57) ABSTRACT

In one example, a device includes a first interface to receive a request for a service provider recommendation, the request comprising a first geographic position value and a second, different geographic position value, wherein the service provider recommendation comprises a recommendation for a provider of a wireless service for a mobile device, means for determining aggregate signal quality values for service providers at a first location including the first geographic position and at a second location including the second geographic position, means for determining scores for the service providers based on signal quality values for the service providers at the first location and the second location, means for constructing the service provider recommendation comprising an identification of the service provider having the highest score, and a second interface to output the service provider recommendation.

16 Claims, 10 Drawing Sheets

(56) References Cited

U.S. PATENT DOCUMENTS

| | | | |
|---|---|---|---|
| 2007/0004427 | A1 | 1/2007 | Morgan et al. |
| 2007/0270164 | A1 | 11/2007 | Maier et al. |
| 2007/0273558 | A1* | 11/2007 | Smith et al. ............... 340/995.1 |
| 2009/0042557 | A1 | 2/2009 | Vardi et al. |
| 2009/0047944 | A1* | 2/2009 | Johnson et al. ............... 455/424 |
| 2009/0063379 | A1* | 3/2009 | Kelly ............................... 706/46 |
| 2009/0177387 | A1* | 7/2009 | Liu ................................. 701/209 |
| 2009/0227251 | A1 | 9/2009 | Lei et al. |
| 2010/0004019 | A1 | 1/2010 | Di Caprio et al. |
| 2010/0153001 | A1* | 6/2010 | Bauchot et al. ............... 701/201 |
| 2010/0157823 | A1* | 6/2010 | Li et al. ......................... 370/252 |
| 2011/0208668 | A1 | 8/2011 | Phillips |

OTHER PUBLICATIONS

Mobiledia, "Cell Phone Carriers: Can You Hear Me Now?" retrieved from http://www.cellreception/com/ on Jan. 26, 2010, 2 pp.

Office Action from U.S. Appl. No. 12/757,784, dated Mar. 1, 2012, 20 pp.

Response to Office Action dated Mar. 1, 2012, from U.S. Appl. No. 12/757,784, filed Jun. 1, 2012, 13 pp.

Office Action from U.S. Appl. No. 12/757,764, dated Feb. 23, 2012, 13 pp.

Response to Office Action dated Feb. 23, 2012, from U.S. Appl. No. 12/757,764, filed Apr. 23, 2012, 12 pp.

Office Action from U.S. Appl. No. 13/250,403, dated Feb. 23, 2012, 12 pp.

Response to Office Action dated Feb. 23, 2012, from U.S. Appl. No. 13/250,403, filed Apr. 23, 2012, 13 pp.

Office Action from U.S. Appl. No. 12/757,764, dated Nov. 14, 2011, 13 pp.

Response to Office Action dated Nov. 14, 2011, from U.S. Appl. No. 12/757,764, filed Feb. 14, 2012, 15 pp.

Office Action from U.S. Appl. No. 13/250,403, dated Nov. 14, 2011, 13 pp.

Response to Office Action dated Nov. 14, 2011, U.S. Appl. No. 13/250,403, filed Feb. 14, 2012, 17 pp.

Office Action from U.S. Appl. No. 12/757,784, dated Nov. 21, 2012, 22 pp.

Response to Office Action dated Nov. 21, 2012, from U.S. Appl. No. 12/757,784, filed Feb. 21, 2013, 12 pp.

Non-Final Office Action from U.S. Appl. No. 12/757,764, dated Oct. 16, 2012, 5 pp.

Response to Non-Final Office Action dated Oct. 16, 2012, from U.S. Appl. No. 12/757,764, filed Jan. 16, 2013, 10 pp.

Final Office Action from U.S. Appl. No. 12/757,784, dated Apr. 10, 2013, 23 pp.

\* cited by examiner

SERVICE PROVIDER RECOMMENDATION ENGINE

This application is a continuation of U.S. application Ser. No. 12/757,784, filed Apr. 9, 2010 which claims the benefit of priority to U.S. Provisional Application No. 61/306,821, filed Feb. 22, 2010, which is hereby incorporated by reference in its entirety.

TECHNICAL FIELD

This disclosure relates to mobile communication devices.

BACKGROUND

Various service providers for mobile device networks commonly claim to provide the "best coverage," "fastest service," or similar claims. Typically, these claims are based on data collected from internal surveys or small, third-party studies that provide one-time assessments of network quality. Verifying these claims on a large scale and comparing various service providers to each other may often be difficult.

SUMMARY

In one example, a method includes receiving data sets from a plurality of mobile devices, each of the data sets comprising a geographic position value identifying a geographic position of a corresponding one of the plurality of mobile devices and a signal quality value representative of signal quality for the corresponding one of the plurality of mobile devices at the geographic position, wherein the geographic position value and the signal quality value are determined by the corresponding one of the plurality of mobile devices, receiving a request for signal quality data at a requested geographic position, and, responsive to the request, providing, by a computing device, an aggregate signal quality value representative of an average signal quality at a location including the requested geographic position, wherein the aggregate signal quality value comprises an aggregation of signal quality values of the data sets that also have geographic position values contained within the location.

In another example, a device includes a mobile device interface configured to receive data sets from a plurality of mobile devices, each of the data sets comprising a geographic position value identifying a geographic position of a corresponding one of the plurality of mobile devices and a signal quality value representative of signal quality for the corresponding one of the plurality of mobile devices at the geographic position, wherein the geographic position value and the signal quality value are determined by the corresponding one of the plurality of mobile devices, a computer-readable storage medium configured to store the data sets, a request interface configured to receive a request for signal quality data at a requested geographic position, and means for providing an aggregate location value representative of an average signal quality at a location including the requested geographic position, wherein the aggregate signal quality value comprises an aggregation of signal quality values of the data sets that also have geographic position values contained within the location.

In another example, a computer-readable medium, such as a computer-readable storage medium, is encoded with instructions that cause a programmable processor to receive data sets from a plurality of mobile devices, each of the data sets comprising a geographic position value identifying a geographic position of a corresponding one of the plurality of mobile devices and a signal quality value representative of signal quality for the corresponding one of the plurality of mobile devices at the geographic position, wherein the geographic position value and the signal quality value are determined by the corresponding one of the plurality of mobile devices, receive a request for signal quality data at a requested geographic position, and, responsive to the request, provide an aggregate location value representative of an average signal quality at a location including the requested geographic position, wherein the aggregate signal quality value comprises an aggregation of signal quality values of the data sets that also have geographic position values contained within the location.

In another example, a method includes receiving a request for a service provider recommendation, the request comprising a first geographic position value and a second, different geographic position value, wherein the service provider recommendation comprises a recommendation for a provider of a wireless service for a mobile device, determining aggregate signal quality values for service providers at a first location including a first geographic position corresponding to the first geographic position value and at a second location including a second geographic position corresponding to the second geographic position value, determining, by at least one computing device, scores for the service providers based on signal quality values for the service providers at the first location and the second location, and outputting the service provider recommendation comprising an identification of the service provider having the highest score.

In another example, a device includes a first interface to receive a request for a service provider recommendation, the request comprising a first geographic position value and a second, different geographic position value, wherein the service provider recommendation comprises a recommendation for a provider of a wireless service for a mobile device, means for determining aggregate signal quality values for service providers at a first location including a first geographic position corresponding to the first geographic position value and at a second location including a second geographic position corresponding to the second geographic position value, means for determining scores for the service providers based on signal quality values for the service providers at the first location and the second location, means for constructing the service provider recommendation comprising an identification of the service provider having the highest score, and a second interface to output the service provider recommendation.

In another example, a computer-readable storage medium is encoded with instructions that cause a programmable processor to receive a request for a service provider recommendation, the request comprising a first geographic position value and a second, different geographic position value, wherein the service provider recommendation comprises a recommendation for a provider of a wireless service for a mobile device, determine aggregate signal quality values for service providers at a first location including a first geographic position corresponding to the first geographic position value and at a second location including a second geographic position corresponding to the second geographic position value, determine scores for the service providers based on signal quality values for the service providers at the first location and the second location, and output the service provider recommendation comprising an identification of the service provider having the highest score.

The techniques of this disclosure may provide several advantages. For example, these techniques may simplify the task of verifying claims by service providers of providing the "best service" or "most coverage." These techniques may also provide a mechanism by which to recommend a service provider based on one or more criteria including, for example, areas frequented by a user requesting the service provider recommendation.

The details of one or more examples are set forth in the accompanying drawings and the description below. Other features, objects, and advantages will be apparent from the description and drawings, and from the claims.

DETAILED DESCRIPTION

Figure 1:
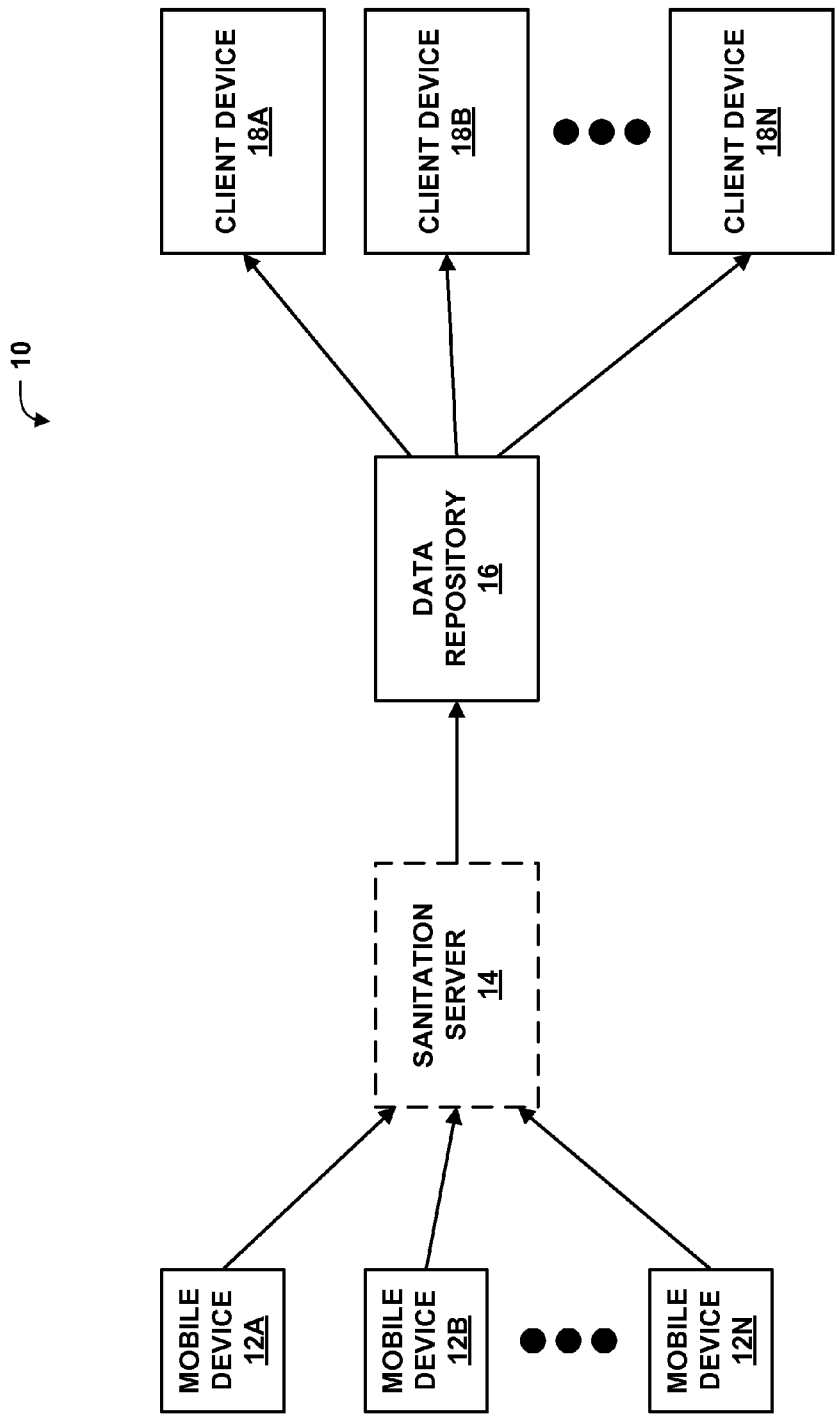
FIG. 1 is a block diagram illustrating an example system in which a data repository collects signal quality data from mobile devices and provides the signal quality data to client devices.

In general, this disclosure describes techniques for collecting and distributing network performance information for mobile devices. The techniques may include collecting network performance information from a plurality of mobile devices, which may be configured to use services provided by various service providers. The mobile devices may each periodically determine a signal quality value at a particular geographic position and then upload the signal quality and position data to a centralized server, along with an indication of a service provider for the respective mobile device. In various examples, the signal quality value may reflect any or all of latency, data transfer rates, packet loss rates, data corruption rates, signal to noise ratios, or other measures of signal quality.

The server may aggregate the signal quality data for various regions. The server may then determine which service providers have the highest signal qualities in the respective regions. Similar or additional determinations may be made for particular networks, mobile device models, or other criteria. This data may be used for many purposes. For example, the service providers may use this data to determine whether particular regions require improvements, e.g., addition or repair of cellular towers in the regions. Consumers may also use the data to determine which service provider to subscribe to in a particular region, or when a service provider has upgraded a region, e.g., by installing a new cellular tower in the region. In this manner, the techniques may be used to provide a comprehensive, real-time system for gathering, summarizing, and exposing information about the quality of a network given a geographical position.

As another example, the data may be used to make a recommendation of a service provider and/or mobile device based on one or more locations frequented by a user and devices sold by a service provider. For example, a user may provide an indication of one or more locations at which the user spends a significant amount of time, e.g., home, work, on the road to work, a friend or relative's house, or other locations. The user may further rank the importance of having a strong service signal or high data transfer rates in such regions. In accordance with the techniques of this disclosure, a recommendation engine may retrieve data for each of the regions of interest for a user and calculate which of a plurality of service providers would provide the best service for the user based on the user's criteria for the regions. Additionally, the recommendation engine may take into account other constraints, such as, for example, specific services requested by a user, features of phones sold by the service provider (e.g., a camera of a particular resolution or a physical keyboard), available connection types, pricing restrictions, or other constraints. The recommendation engine may exclude service providers that do not satisfy these constraints or reduce a score for a service provider that does not satisfy the constraints.

FIG. 1 is a block diagram illustrating an example system 10 in which data repository 16 collects signal quality data from mobile devices 12A-12N ("mobile devices 12") and provides the signal quality data to client devices 18A-18N ("client devices 18"). In the example of FIG. 1, system 10 includes mobile devices 12, data repository 16, client devices 18, and an optional sanitation server 14 (as indicated by the dashed outline). In some examples, one or more of client devices 18 may also provide data to data repository 16 via sanitation server 14.

Mobile devices 12 may correspond to any devices that are configured to receive and/or transmit data via a wireless network. For example, mobile devices 12 may correspond to any or all of cellular telephones, laptops equipped with wireless access cards, or navigation system units. Mobile devices 12 may communicate via a wireless network provided by any of a plurality of service providers. The wireless network may conform to any mobile telecommunications standard, such as, for example, International Mobile Telecommunications-2000 ("ITM-2000" or "3G") or I™-Advanced (also referred to as "4G"), Enhanced Data rates for GSM Evolution (EDGE), or any other mobile telecommunications standard, such as those defined by the International Telecommunication Union.

In general, mobile devices 12 are configured to periodically upload signal quality and position data to data repository 16. For example, users of mobile devices 12 may have downloaded an application that runs on each of mobile devices 12 to periodically upload the signal quality and position data. As another example, mobile devices 12 may, transparently to the users, execute an operating system module that periodically uploads the signal quality and position data. In examples including sanitation server 14, mobile devices 12 may upload the data via sanitation server 14, while in other examples, mobile devices 12 may upload the data directly to data repository 16. Web-based applications executing on mobile devices 12 may send signal quality data along with a geographic position corresponding to the signal quality data to sanitation server 14, which does not log the data but forwards the data on to data repository 16, which may log the data, as described in greater detail below. In general, users may be provided with the ability to opt-in and/or opt-out of a service that periodically uploads the signal quality and position data. For example, a user interface screen in a settings menu of mobile devices 12 may enable a user to opt-in or opt-out of data collection by a remote server, such as the uploading of position and signal quality data to data repository 16.

Mobile devices 12 may communicate with sanitation server 14 or data repository 16 according to a network communication protocol, such as, for example, hypertext transfer protocol (HTTP), HTTP secured by transport layer security or secure sockets layer (HTTPS), simple mail transfer protocol (SMTP), simple object access protocol (SOAP), or other communication protocols. Mobile devices 12 may also be configured to send data via text messages according to the short message service (SMS) or multimedia messaging service (MMS). Mobile devices 12 may additionally communicate the data to data repository 16 via other devices not shown in FIG. 1, such as, for example, cellular towers, routers, switches, gateways, security devices such as firewalls, or other devices for cellular, wireless, and/or network communication. In some examples, mobile devices 12 are configured to automatically upload signal quality and geographic position data to data repository 16, e.g., at predetermined times, while in other examples, data repository 16 and/or sanitation server 14 requests the data from mobile devices 12.

The data collected by mobile devices 12 and sent to data repository 16 may further include other information that may be useful in differentiating signal quality for mobile devices 12. For example, the data may include an identifier of a service provider (also referred to in this disclosure as a "carrier") that provides service to the respective one of mobile devices 12. As another example, the data may include an identification of a manufacturer of and/or the device model for the respective one of mobile devices 12 that uploaded the data. As still another example, the data may include an identification of a connection type, such as 3G, 4G, EDGE, or other connection type, for the connection corresponding to the one of mobile devices 12. Mobile devices 12 may upload data that includes any or all of a time of day, a service provider, a connection type, a device type, or other data, in addition to the geographic position value and the signal quality value, to data repository 16.

Data repository 16 may provide to client devices 18 an application programming interface (API), such as, for example:

dataRate(int x, int y, RequestData rd);

where RequestData can contain any combination of conditions for parameters such as request/response size, carrier name, network type, etc. Data repository 16 may provide summarized values for unpopulated parameters. The summary may correspond to a mean, median, or other average value. The default response may include the average transfer rate for up/downstream data for the most recent records within a radius of X meters from the given location (where X may be a customizable parameter). A user can also specify such things as including all requests with Y meters of the given location, or over some specific period of time.

The data stored by data repository 16 may include request-specific data, such as the size of a request and response, service provider identification, network connection type, signal strength, date and time, device brand/model, operating system version, or other data. Data repository 16 may create a large database of transfer rates (e.g., latency values or other signal quality values) for different geographical positions and request-specific data, so that client devices 18 may query the data.

Sanitation server 14, when present in system 10, is configured to remove personally identifiable information from data received from mobile devices 12. For example, when data received from mobile devices 12 includes any or all of an Internet protocol (IP) address, a client identifier, a username, or other identifying information, sanitation server 14 may remove this information from the data and then send the data to data repository 16. Sanitation server 14 may be configured such that received data is stored only for a length of time sufficient to remove this information can be removed and the data can be forwarded to data repository 16. In some examples, sanitation server 14 forwards data to data repository 16 in batches, to further prevent the possibility of identifying users of mobile devices 12 by data repository 16 or devices coupled to data repository 16, such as client devices 18. That is, sanitation server 14 may send data to data repository 16 received from mobile devices 12 at defined intervals, rather than contemporaneous with receipt of data from mobile devices 12. System 10 may include multiple sanitation servers in some examples, such that mobile devices 12 may upload data via a nearest one of the sanitation servers. In some examples, sanitation server 14 may be configured to periodically drop data received from mobile devices 12, to reduce the chances of another device or user being able to reconstruct the positions of any particular individual user of mobile devices 12 from the data. In some examples, sanitation server 14 may be configured to periodically generate random "dummy" data or tweak received data slightly, again to reduce the chances of another device or user being able to reconstruct the positions of any particular individual user of mobile devices 12 from the data.

Data repository 16 receives and aggregates signal quality data for various locations. In general, this disclosure refers to a "location" as a region encompassing a geographic area having a particular size. The locations may each have the same size or may have different sizes. In general, when one of mobile devices 12, such as mobile device 12A, uploads data to data repository 16, the uploaded data includes a geographic position of mobile device 12A at a particular time, as well as a signal quality value at the geographic position and at the time. Upon receiving data from one of mobile devices 12, data repository 16 may extract the geographic position and determine a location including the geographic position, and then calculate an aggregate of signal quality values, including the recently received signal quality value from the mobile device, for the location. Data repository 16 may also store the data as raw data entries in a database.

Signal quality may include quality values for various types of signals used by mobile devices 12, such as, for example, a dedicated voice signal and a data signal. The techniques of this disclosure are discussed primarily with respect to a data signal received by mobile devices 12. However, it should be understood that similar techniques may be applied to voice signals received by mobile devices 12.

Mobile devices 12 may be configured to determine the signal quality value and the geographic position value in a variety of ways. The signal quality value, for example, may correspond to latency of data transfer, e.g., the round-trip delay between a request for data and when the data is received. The signal quality value may also correspond to an average data transfer rate. The request for data may correspond to a user's request for data, e.g., a user-initiated hypertext transfer protocol (HTTP) request using a browser of the one of mobile devices 12. The request may also correspond to a request automatically sent by mobile devices 12, such as a ping request. Mobile devices 12 may be configured to measure latency, e.g., the time between sending the request and receiving the requested data, and set the signal quality value according to the measured latency.

In other examples, the signal quality value may correspond to metrics other than, or in addition to, latency. For example, the signal quality value may correspond to a received signal strength indication (RSSI), which is a measurement of power in a received radio signal. As another example, the signal quality value may correspond to a signal-to-noise (SNR) ratio value. As another example, the signal quality value may correspond to a data transfer rate. As another example, the signal quality value may correspond to media access control (MAC) layer measurements of signal quality, such as, for example, measurements of errors occurring in MAC layer data received by the signal.

Mobile devices 12 may be configured to determine a geographic position in a variety of ways. Mobile devices 12 need not each determine a respective geographic position in the same way. For example, certain ones of mobile devices 12 may be equipped with a global positioning system (GPS) receiver, while others of mobile devices 12 may be configured to determine a geographical position by triangulating the position based on signal strengths of nearby cellular towers. Mobile devices 12 including a GPS receiver may determine the geographic position by retrieving the geographic position from the GPS receiver. On the other hand, mobile devices 12 that do not include a GPS receiver may calculate the geographic position by triangulating a position from nearby cellular towers. For example, one of mobile devices 12 that does not include a GPS receiver may calculate relative signal strengths of nearby cellular towers, and correlate the signal strength of a tower with distance from the tower. Then, based on the correlated distances from nearby towers, and the positions of the nearby towers, the one of mobile devices 12 may estimate a current geographic position for itself.

Data repository 16 may be configured to store geographic position values in a common format, e.g., a format similar to a GPS format. Accordingly, when data repository 16 receives a data set including a geographic position value in a different format, such as a format corresponding to the use of triangulation to determine the position value, data repository 16 may convert the geographic position value to the common format. In some examples, the GPS format may correspond to a latitude/longitude integer in tenths of microdegrees, also referred to as "E7" format. That is, the GPS format may describe a latitude position in fractions of microdegrees and a longitude position in fractions of microdegrees.

Client devices 18 may interact with data repository 16 to retrieve data uploaded from mobile devices 12. Client devices 18 may use this data in a variety of ways. For example, a service provider may use one of client devices 18 to retrieve the data and determine locations that need network maintenance or upgrades, such as a need for repair, replacement, or addition of cellular towers. Service providers, advertisers, and others may also validate claims of providing the best service, best coverage, or other such claims using the signal quality data.

As another example, one of mobile devices 12 or a different mobile device may retrieve the data to determine if a nearby location has a better signal quality than a current position. In this manner, mobile devices 12 may also act as client devices 18. As an example, a user may experience poor signal quality in a current location while using one of mobile devices 12, e.g., mobile device 12A. Mobile device 12A may retrieve signal quality values for locations near the current location, determine which of the locations has a better signal quality, if any, and then display instructions to the user to move to the location. For example, mobile device 12A may display a message that states, "Signal quality at your current location is low. Please move 15 meters northeast for a better signal."

As another example, one of client devices 18 may correspond to a data provider (for example, a server) that determines a current location of one of mobile devices 12, e.g., mobile device 12A. The data provider may request the current geographic position from mobile device 12A when mobile device 12A requests data from the data provider. Alternatively, mobile device 12A may include an indication of the current geographic position along with a request for data. The data provider may use the current geographic position of mobile device 12A, then query data repository 16 for an aggregate signal quality at the location including the geographic position of mobile device 12A. Then, the data provider may use the aggregate signal quality value to determine an amount of data to send to mobile device 12A. For example, when the data provider is a video server, the data provider may send a high quality version of video data (having a relatively high bitrate, for example) to mobile device 12A when the aggregate signal quality is relatively high in the location, but send a lower quality version of the video data to mobile device 12A when the aggregate signal quality is relatively low in the location.

As another example, and as discussed in greater detail below, a recommendation server, as discussed with respect to FIG. 4 for example, may retrieve the data from data repository 16. The recommendation server may determine which service provider provides the best service at one or more locations, and then provide a recommendation of a service provider based on one or more locations frequented by a user. That is, the user may select the one or more locations and request a recommendation of the service provider with the highest signal quality at the one or more locations. The recommendation server may determine which of the service providers has the highest signal quality at the one or more locations and provide a recommendation of that service provider to the user. In some examples, the recommendation server also determines a particular mobile device or type of device to recommend to a user, based on requests from the user, devices that fit criteria specified in the request, devices provided (e.g., sold) by a service provider recommended to the user, or other criteria.

In this manner, system 10 may provide a mechanism for mining, organizing, and exposing information about mobile network performance. Client devices 18 may request historical information, such as average throughput rate for mobile data in a particular location based on various criteria, such as, for example, date, time of day, network connection type, service provider, and other similar data. A computing device within data repository 16 or coupled to data repository 16 may mine data repository 16 for data transfer rates based on GPS coordinates.

System 10 may provide one or more advantages. For example, system 10 may simplify the task of verifying claims by service providers of providing the "best service" or "most coverage" for a provided service. System 10 may also provide a mechanism by which to recommend a service provider based on one or more criteria including, for example, areas frequented by a user requesting the service provider recommendation.

Figure 2:
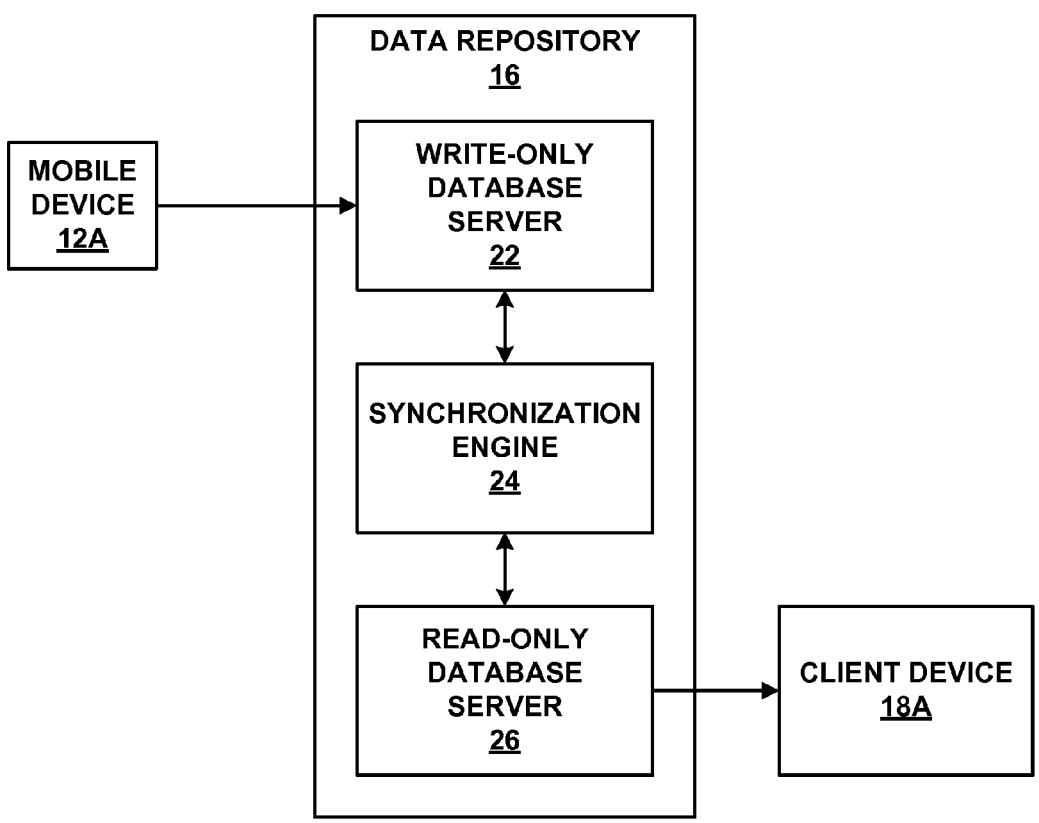
FIG. 2 is a block diagram illustrating an example set of components of a data repository.

FIG. 2 is a block diagram illustrating an example set of components of data repository 16. In the example of FIG. 2, data repository 16 includes write-only database server 22, synchronization engine 24, and read-only database server 26. Mobile devices 12, such as mobile device 12A, write data to write-only database server 22, while client devices, such as client device 18A, reads data from read-only database server 26. Read-only database server 26 is considered "read only" in the sense that external devices are not able to write data to read-only database server 26.

In general, when mobile devices 12 send data, such as geographic positions and signal quality values, to data repository 16, write-only database server 22 receives the data from mobile devices 12. Synchronization engine 24 synchronizes data between write-only database server 22 and read-only database server 26. In some examples, synchronization engine 24 writes new data received by write-only database server 22 to read-only database server 26 shortly following receipt by write-only database server 22. In other examples, synchronization engine 24 periodically determines whether write-only database server 22 has received new data and synchronizes the new data to read-only database server 26. In still other examples, synchronization engine 24 may determine whether any of client devices 18 are reading data from read-only database server 26, and synchronize data between write-only database server 22 when read-only database server 26 is not providing data to client devices 18. In still other examples, synchronization engine 24 may synchronize data between write-only database server 22 and read-only database server 26 when mobile devices 12 are not writing data to read-only database server 22 and client devices 18 are not reading data from read-only database server 26.

In this manner, mobile devices 12 may be able to uninterruptedly provide data to data repository 16, and client devices 18 may be able to uninterruptedly retrieve data from data repository 16. That is, data repository 16 may avoid conflicts in situations when, for example, one or more of mobile devices 12 attempt to write data to data repository 16 at the same time that one or more of client devices 18 attempt to read data from data repository 16.

The description of data repository 16 provided with respect to FIG. 2 is one example for data repository 16. In other examples, data repository 16 may include a single database that is locked or unlocked to prevent contemporaneous reads and writes.

Figure 3:
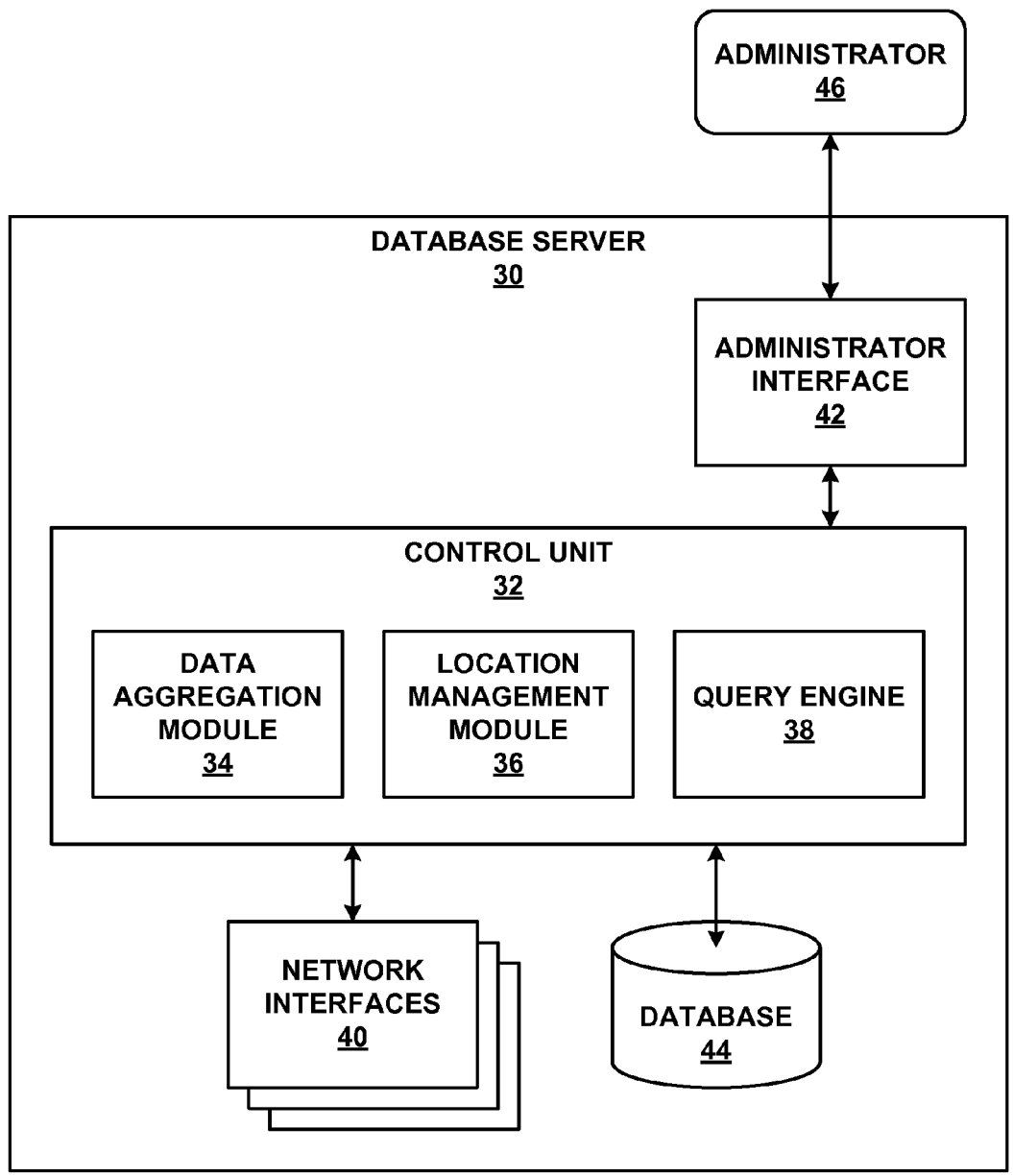
FIG. 3 is a block diagram illustrating an arrangement of components of an example database server.

FIG. 3 is a block diagram illustrating an arrangement of components of an example database server 30. Database server 30 may correspond to write-only database server 22, read-only database server 26, or data repository 16 generally. In the example of FIG. 3, database server 30 includes control unit 32, network interfaces 40, administrator interface 42, and database 44. Control unit 32 includes data aggregation module 34, location management module 36, and query engine 38, in the example of FIG. 3.

Control unit 32 may include any combination of hardware, software, and or firmware for performing the functions attributed to control unit 42. For example, control unit 32 may include a computer-readable storage medium encoded with instructions for data aggregation module 34, location management module 36, and query engine 38, as well as a processor that executes the instructions. In another example, control unit 32 may include one or more microprocessors, digital signal processors (DSPs), application specific integrated circuits (ASICs), field programmable gate arrays (FPGAs), or any other equivalent integrated or discrete logic circuitry, as well as any combinations of such components. Similarly, any or all of data aggregation module 34, location management module 36, and query engine 38 may be functionally integrated.

Network interfaces 40 receive and output data over a network, such as the Internet. In one example, one of network interfaces 40 may correspond to an interface for receiving data from mobile devices 12. In one example, one of network interfaces 40 may correspond to an interface for receiving data from synchronization engine 24. In any case, input interfaces of network interfaces 40 receive data including geographical position values and corresponding signal strength and/or quality values at the respective geographical position values. Output interfaces of network interfaces 40 may, in various examples, include one or more interfaces for outputting data to synchronization engine 24 and/or client devices 18. In some examples, input and output network interfaces 40 may be functionally integrated, while in other examples, input and output interfaces may be separate interfaces of network interfaces 40. For example, network interfaces 40 may include one or more network interface cards (NICs) configured to communicate over, for example, Ethernet, transmission control protocol (TCP), Internet protocol (IP), asynchronous transfer mode (ATM), or other network communication protocols. In some examples, database server 30 may include a plurality of either or both input and output interfaces.

Database 44 may include various fields, such as geographic position, signal quality, time of day, service provider, connection type, device type, or other fields. Control unit 32 may store position data to database 44 in the geographic position field in a format similar to a global positioning system (GPS) format, e.g., including a latitude value in degrees, minutes, and seconds and a longitude value in degrees, minutes and seconds. Control unit 32 may also store an altitude value to database 44 with the geographic position value. In some examples, control unit 32 may convert a geographic position value received from one of mobile devices 12 to a GPS format, e.g., when the mobile device uploads the value in a different format, such as a triangulated position format. Control unit 32 may store signal quality values in the signal quality field of database 44. In some examples, database 44 may be structured as a Google File System and/or a Google BigTable database system.

Data aggregation module 34 receives geographical position values and corresponding signal strength and/or quality values from mobile devices 12 via input interface 40. Upon receiving a geographical position value and a corresponding signal strength value, data aggregation module 34 determines a location including the geographical position value and calculates an aggregate signal strength and/or quality value for the location based on a previous aggregate signal strength and/or quality value and the received signal strength value corresponding to the received geographical position value. In some examples, data aggregation module 34 weights all signal strength values equally, while in other examples, data aggregation module 34 weights recently received signal strength values more heavily than previously received signal strength and/or quality values. Data aggregation module 34 may also utilize any moving average function to calculate an aggregate signal strength value for the location based on a newly received signal strength value and an existing aggregate signal strength value for the location. For example, data aggregation module 34 may calculate a cumulative moving average, a weighted moving average, an exponential moving average or a modified moving average of the signal strength values for a location to calculate the aggregate signal strength value.

In one example, to weight signal strength values equally, data aggregation module 34 maintains an entry counter for the location, as well as an aggregate signal strength value for the location. Accordingly, upon receiving a new signal strength value for the location, data aggregation module 34 may multiply the current aggregate signal strength value by the entry counter, add the newly received signal strength value, and then divide by the entry counter value plus one. The following pseudocode provides an example implementation for equally weighting each signal strength value of a location.

```
float aggregateSignalValues (Location location, float newSigStrength) {
    float currentAggValue = getAggStrength(location);
    int entryCount = getEntryCount(location);
    float newAggStrength = ((currentAggValue * entryCount) +
    newSigStrength)
        / (entryCount+1);
    incrementEntryCount(location);
    setAggStrength(location, newAggStrength);
    return newAggStrength;
}
```

The example pseudocode returns a "float" (that is, a floating point value) representative of the new aggregate strength value for the location value received as an argument, aggregated with the new signal strength value received as the argument "newSigStrength." The pseudocode also receives an object of type "Location" named location and a floating point value "newSigStrength" as an argument. The newSigStrength value is a signal strength value of newly received data from a mobile device at a geographical position within the location corresponding to the received location value. Each entry is weighted equally, because the existing aggregate value (currentAggValue, set by calling getAggStrength(location)) is multiplied by the current number of entries (entryCount, set by calling getEntryCount(location)). This product is then added to newSigStrength, which represents the signal strength value of a newly received signal strength value corresponding to the location. This sum is then divided by entryCount+1, which weights the new signal strength value equally with all other previously received entries for the location, resulting in a new aggregate signal strength value (newAggStrength). The location's entry count value is then incremented, e.g., set to a value equal to the previous value plus one (incrementEntryCount(location)), and the location's aggregate strength value is reset by calling setAggStrength(location, newAggStrength). In other examples, rather than using floating point values, a scaled integer or "double" value may be used in the algorithm for aggregateSignalValues.

In some examples, data aggregation module 34 also receives data via network interfaces 40 from mobile devices 12 and stores the received data in database 40. That is, in addition to calculating aggregate signal strength values for locations corresponding to geographic positions for which new signal strength values are received, data aggregation module 34 may also add raw data to database 44. Database server 30 may receive any or all of an indication of a carrier (e.g., a service provider), a connection type, and/or a device type from mobile devices 12, in addition to a geographical position value and a corresponding signal quality value. When database server 30 receives a geographical position value in a format other than the format for geographical position values stored by database 44, control unit 32 may convert the value to a format corresponding to the format of geographical values stored by database 44.

Administrator 46 may configure database server 30 via administrator interface 42. Administrator interface 42 may include one or more of a display, a keyboard, a mouse, a touchscreen, a light pen, speakers, or other input and/or output devices for interacting with database server 30. In other examples, administrator 46 may configure database server 30 using a remote computing device that is communicatively coupled to database server 30, e.g., according to the simple network management protocol (SNMP). Administrator 46 may also log into database server 30 remotely using, for example, a secure shell protocol (SSH) client, a Telnet client, Remote Desktop, or other applications and modify configuration of database server 30. In such examples, administrator interface 42 may be functionally integrated with network interfaces 40 for participating in such network sessions.

Location management module 36 provides mechanisms by which a user, such as administrator 46, may manage locations for which data are received by database server 30. As discussed in this disclosure, a location may correspond to a geographical area having a particular size, e.g., several square meters. In some examples, a location is a square- or rectangular-shaped geographical area, while in other examples, a location may be circular, hexagonal, or any other geometric shape. In general, a location may include data for one or more geographical positions.

As an example, a location may be defined as a circular region with a center at a particular geographical position and a radius of a defined size, e.g., six meters. As another example, a location may be defined as a square region with a first corner at a defined geographical position, a second corner at a geographical position a distance D to the east of the first corner, a third corner at a geographical position at distance D to the south of the first corner, and a fourth corner at a geographical position at distance D to the east and distance D to the south of the first corner. Other similar techniques may also be used to define a location. Geographical positions falling within the area of a location are said to be located within the respective location. Thus with respect to the circular region example, a geographical position would be located within the location if the geographical position were a distance from the center of the circle that is less than the radius of the circle.

Location management module 36 may enable administrator 46 to configure the size of locations, view or modify data for locations stored by database 44, create new locations, set the size of each location to the same value or set the size of locations independently, set the geometric shape of the locations, or perform other similar actions. Administrator 46 may also use location management module 36 to determine whether a particular geographical position for which data has been received falls within two or more locations, or whether two or more locations overlap the same geographical position or area. In some examples, data for a geographical position that falls within two or more locations may be aggregated into each aggregate signal strength value for the respective locations. In other examples, location management module 36 may (e.g., automatically or at the direction of administrator 46) aggregate the signal strength values for the geographical position into only one of the locations.

Query engine 38 may receive and process queries from, for example, client devices 18 via network interfaces 40. Query engine 38 may process each query to determine entries of database 44 that satisfy the query. Query engine 38 may return the entries that satisfy the query to a requester that issued the query. Database 44 may be structured as a relational database, in which case the queries may correspond to relational database queries, for example, structured query language (SQL) queries. Accordingly, query engine 38 may implement SQL or another relational database querying language to process the queries. In other examples, database 44 may be structured as a multidimensional database and/or be configured for online analytic processing (OLAP), in which case query engine 38 may be configured to execute multidimensional expression (MDX) queries and/or online analytical processing (OLAP) queries.

Figure 4:
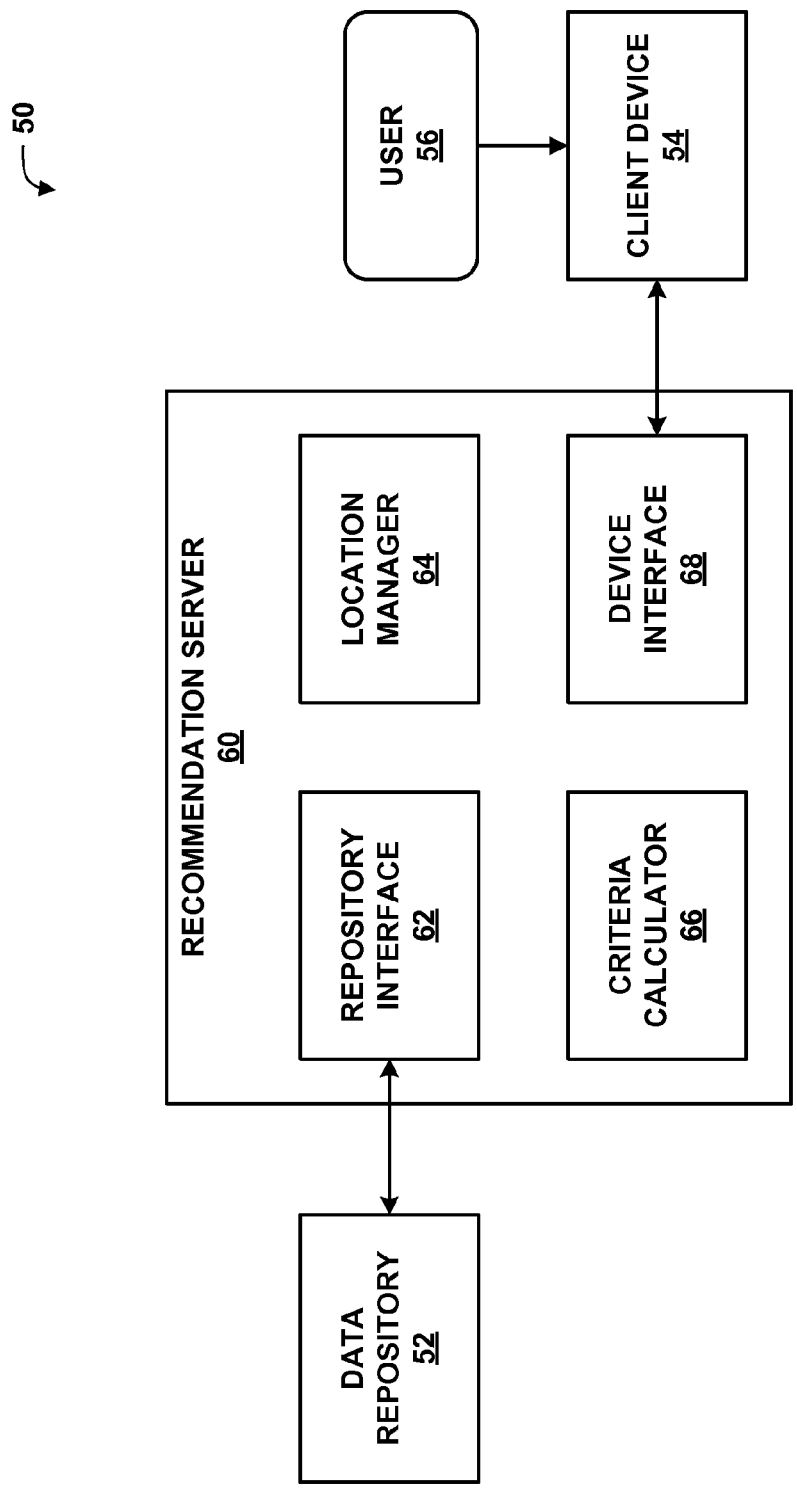
FIG. 4 is a block diagram illustrating an example system in which a recommendation server retrieves data from a data repository and recommends service providers to client device.

FIG. 4 is a block diagram illustrating an example system 50 in which recommendation server 60 retrieves data from data repository 52 and recommends service providers and/or mobile devices to client device 54. User 56 interacts with client device 54 to provide one or more positions and associated weight values to recommendation server 60 to obtain a recommendation of a service provider. Data repository 52 may include components and perform functions similar to, for example, data repository 16 and/or database server 30. In some examples, client device 54 corresponds to one of client devices 18 (FIG. 1).

Recommendation server 60, in the example of FIG. 4, includes repository interface 62, location manager 64, criteria calculator 66, and device interface 68. Repository interface 62 and/or device interface 68 may correspond to network interfaces, such as network interface cards (NICs), for communicating with data repository 52 and client device 54, respectively. Repository interface 62 may be communicatively coupled to data repository 52 via one or more intermediate devices, e.g., network devices such as routers, switches, gateways, security devices, servers, clients, or other network devices that support network communication. Similarly, device interface 68 may be communicatively coupled to client device 54 via one or more intermediate devices.

User 56 may be a user searching for a service provider for a mobile device, such as, for example, a cellular telephone, a smart phone, a wireless Internet card, a navigation device, or other mobile device. User 56 may already be in possession of a current mobile device. For example, client device 54 may be a mobile device. Alternatively, client device 54 may be a stationary device or a device that is not used with a service provider network of the type for which user 56 is seeking a recommendation.

User 56 may input a set of one or more geographic positions where user 56 particularly desires service availability and relatively high quality signal strengths. These positions may be referred to in this disclosure as "positions of interest" of user 56. These positions may correspond to geographic positions where user 56 spends a relatively high amount of time during an average week. For example, user 56 may select positions corresponding to the user's work, home, a friend or relative's house, paths (e.g., roads) between geographic positions, or other places frequented by user 56.

To receive the positions of interest, client device 54 may present a graphical user interface including a map and/or a set of text fields. User 56 may input a position of interest by typing an address for the position of interest in an "address" text field or by selecting a point on the map. In some examples, client device 54 may correspond to a mobile device equipped with an application that automatically determines places where user 56 frequents, when user 56 enables the application to do so.

For example, client device 54 may periodically determine a geographical position of client device 54, as well as a time of day. If the current geographical position is within a certain distance of one or more previous geographical positions for a period of time or at a particular time of day, client device 54 may automatically assign one of the geographical positions as a position of interest. For example, client device 54 may determine a central geographic position, that is, a geographic position located at or near the center of the geographic positions at which client device 54 was present for a period of time, is a position of interest.

Moreover, client device 54 may automatically label the position of interest based on the time of day during which client device 54 is present at the geographical positions. For example, if client device 54 is within a certain distance of a geographical position from 8:00 am to 5:00 pm, client device 54 may automatically label a corresponding position of interest "work." As another example, if client device 54 is within a certain distance of a geographical position from 6:00 pm to 7:00 am on weekdays and/or all day or a majority of the day on weekends, client device 54 may automatically label the corresponding position of interest "home." In some examples, client device 54 may correspond to a device executing Google Latitude to retrieve the current location of client device 54.

Moreover, an application executing on client device 54 may periodically retrieve the location of client device 54 to determine areas frequented by user 56 of client device 54, e.g., to automatically configure geographical positions of interest for user 56. The application may also be configured to automatically set weight values for locations based on, for example, time spent in respective locations including the geographic positions. For example, when client device 54 spends 40 hours per week in a first location and 20 hours per week in a second location, the application may set a first weight value for the first location at a value that is twice the value of a second weight value for the second location. The application may further be configured to automatically determine the weight value based on whether another signal is available at the location. For example, if the application determines that a wireless access point is present in a location, the application may automatically reduce the weight value for the location.

Client device 54 may also allow user 56 to assign weights (that is, weight values) to each of the positions of interest, or to modify automatically configured weights. For example, client device 54 may present a user interface that displays a map including the positions of interest, and a representation of a weight value on or near each of the positions of interest. The representation may include a graphical or textual representation, such as, for example, a graphical sliding bar or a text field for entering a numeric weight value. User 56 may adjust the graphical sliding bar or enter a textual value in the text field to assign a weight value to a position of interest corresponding to the representation of the weight value. Client device 54 uploads weight values and corresponding geographical positions, that is, positions of interest, to recommendation server 60 via device interface 68. User 56 may provide other criteria along with a request for a service provider recommendation, such as, for example, desired services, requirements for particular mobile devices sold by the service provider, availability of particular mobile devices, or other features or criteria.

Recommendation server 60 may receive a request for a service provider recommendation from client device 54. The request may include one or more positions of interest and associated weight values. In some examples, the request may only include one or more positions of interest, without associated weight values. After receiving the request via device interface 68, criteria calculator 66 evaluates each criteria of the request to determine a service provider to recommend. Criteria calculator 66 may determine for each of the positions of interest, a location including the respective position of interest. Location manager 64 may provide an indication to criteria calculator 66 of a location that includes a region of interest, as well as a corresponding aggregate signal quality value for the location.

Location manager 64 may be configured similarly to location management module 36 (FIG. 3). In some examples, recommendation server 60 may include or use location manager 64 only when data repository 52 does not include a location management module similar to location management module 36. In such examples, recommendation server 60 may extract raw data from data repository 52 and calculate aggregate signal quality values for each of a plurality of locations corresponding to the positions of interest received from client device 54.

Criteria calculator 66 may calculate individual service provider scores for each location including at least one of the positions of interest received in the request. For example, criteria calculator 66 may determine an aggregate signal quality value for each service provider at a particular location. Criteria calculator 66 may further refine an individual service provider score at a location based on the weight value received from client device 54 for the corresponding position of interest. The weight values may correspond to percentage values, integer values, rational numbers, or other values that user 56 generally manipulates to provide a relative indication of importance of having a high-quality signal at a corresponding position of interest. For example, user 56 may set a weight value for "work" relatively high if, for example, the workplace does not provide wireless broadband access to user 56. As another example, user 56 may set a weight value for "home" relatively low if, for example, user 56 has a wireless access point that is connected to the Internet. That is, rather than connecting to a wireless signal while at home, the mobile device may instead connect to the Internet via the wireless access point.

After calculating scores for each service provider at each location including a position of interest, criteria calculator 66 may aggregate the scores for each service provider. Criteria calculator 66 may then determine which service provider has the highest aggregate score for user 56. Criteria calculator 66 may then provide a recommendation to user 56 via client device 54 based on the highest aggregate score. Criteria calculator 66 may also provide a rank-ordered list of recommendations of service providers, e.g., in an order corresponding to the calculated scores for the service providers.

Figure 5:
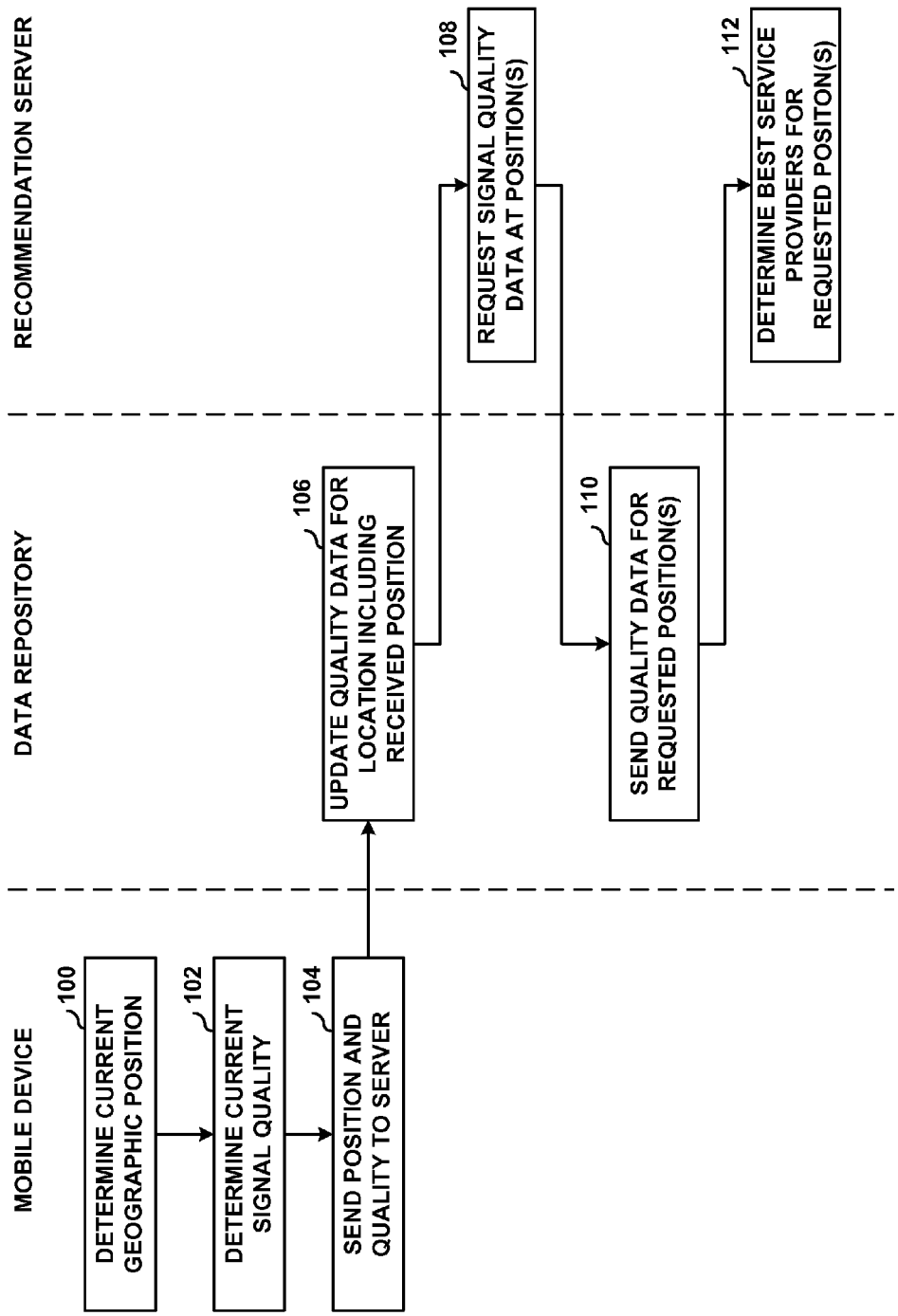
FIG. 5 is a flowchart illustrating an example overview of a method for collecting data from a mobile device and providing the data to a recommendation server, which in turn uses the data to recommend a service provider to a user.

FIG. 5 is a flowchart illustrating an example overview of a method for collecting data from a mobile device and providing the data to a recommendation server, which in turn uses the data to recommend a service provider to a user. Initially, one of mobile devices 12, for example, mobile device 12A, may determine a current geographic position (100). For example, mobile device 12A may retrieve a geographic position value from a GPS unit within mobile device 12A. As another example, mobile device 12A may triangulate a position value based on relative signal strengths of nearby cellular towers.

Mobile device 12A may then determine a current signal quality value corresponding to the geographic position (102). For example, mobile device 12A may measure a signal strength, calculate latency for requested and received data, measure a current signal-to-noise ratio, calculate a data transfer rate, calculate packet loss, calculate a data corruption rate, determine a current bit-rate, determine a current RSSI value, or otherwise determine a signal quality value at the current geographic position. Other signal quality values may include inter-packet time values that correspond to the gap of time between receipt of packets.

Mobile device 12A may then upload the current geographic position and corresponding signal quality value to, for example, data repository 16 (104). Although FIG. 5 illustrates only one instance of a mobile device sending a geographic position and corresponding signal quality value to a data repository, it should be understood that the mobile device may perform steps 100-104 multiple times periodically. Moreover, mobile device 12A may include additional data such as, for example, an indication of a device type for mobile device 12A, an indication of a service provider for mobile device 12A, and/or an indication of a connection type for mobile device 12A.

After data repository 16 receives a signal quality value for a geographic position, data repository 16 may update an aggregate signal quality value for a location that includes the received geographic position (106). Data repository 16 may also add an entry to a database that includes raw data received from mobile device 12A. In this manner, a client device may query the raw data or retrieve an aggregate signal quality value for a location directly.

In the example of FIG. 5, a recommendation server, such as recommendation server 60, then requests signal quality data for one or more geographic positions (108). Recommendation server 60 may request raw data from the data repository that includes not only signal quality values, but also any other corresponding data such as, for example, an indication of a service provider, an indication of a connection type, and/or an indication of a device type that uploaded the data. In some examples, recommendation server 60 may request only raw data that includes an indication of a service provider from the data repository.

Data repository 16 may respond to the request from the recommendation server by providing signal quality data for each of the requested positions to the recommendation server (110). For example, a query engine may determine which entries in a database of data repository 16 have geographical positions corresponding to one of the requested positions, e.g., are within a location that includes at least one of the requested positions or are within a certain range of at least one of the requested positions. Data repository 16 may provide matching entries from the database to the recommendation server. In some examples, data repository 16 may provide aggregate signal quality values for locations including the requested geographical positions to the recommendation server, without providing raw data to the recommendation server. In some examples, data repository 16 may further determine individual service provider signal quality values for each of the locations and send these individual service provider signal quality values to the recommendation server.

After receiving the signal quality data from the data repository, recommendation server 60 may determine which service provider is best for the requested geographical positions (112). For example, recommendation server 60 may apply weight values received from a user to particular locations to determine which of the service providers is best for the set of locations. Recommendation server 60 may also evaluate other criteria to determine which of the service providers is best for the set of geographical positions, such as whether the service providers offer a particular model of mobile device, a particular service, and/or a particular connection type.

Figure 6:
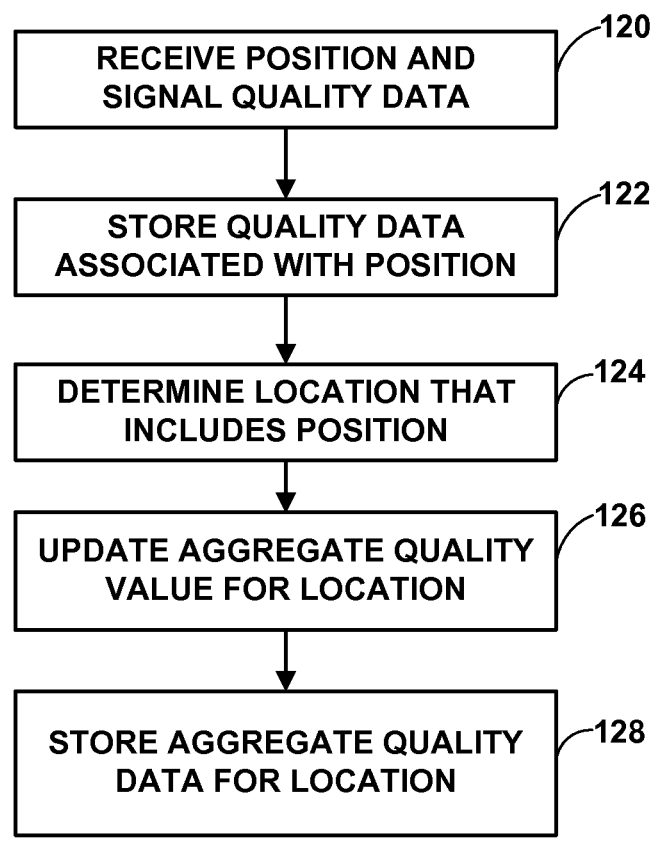
FIG. 6 is a flowchart illustrating an example method for aggregating signal quality data for a location that includes a geographical position for which signal quality data is received.

FIG. 6 is a flowchart illustrating an example method for aggregating signal quality data for a location that includes a geographical position for which signal quality data is received. The method of FIG. 6 may be performed by a data repository, such as data repository 16 or database server 30, and/or by recommendation server 30 or other device that retrieves raw data from a data repository. For purposes of example and explanation, the method of FIG. 6 is described with respect to database server 30 (FIG. 3) although it should be understood that other devices may also perform this or similar methods for aggregating signal quality data for a location that includes a geographical position for which signal quality data has been received.

Initially, database server 30 receives a geographical position and a corresponding signal quality value via one of network interfaces 40 (120). Data aggregation module 34, or another module executed by control unit 32, may then store the signal quality value as being associated with the geographical position (122), e.g., by storing a new entry in database 44 that includes the geographical position and the signal quality value. Data aggregation module 32 may then determine a location that includes the received geographic position value (124). That is, data aggregation module 32 may determine an area of one of a plurality of locations in which the geographic position occurs.

Data aggregation module 32 may then update an aggregate signal quality value for the determined location based on the received signal quality value (126). For example, data aggregation module 32 may calculate a moving average based on the received signal quality value as well as signal quality values corresponding to other geographical positions also within the location for which data was previously received. After calculating the aggregate signal quality value for the location, data aggregation module 32 may store the aggregate signal quality value (128), e.g., in a separate table of database 44.

Figure 7:
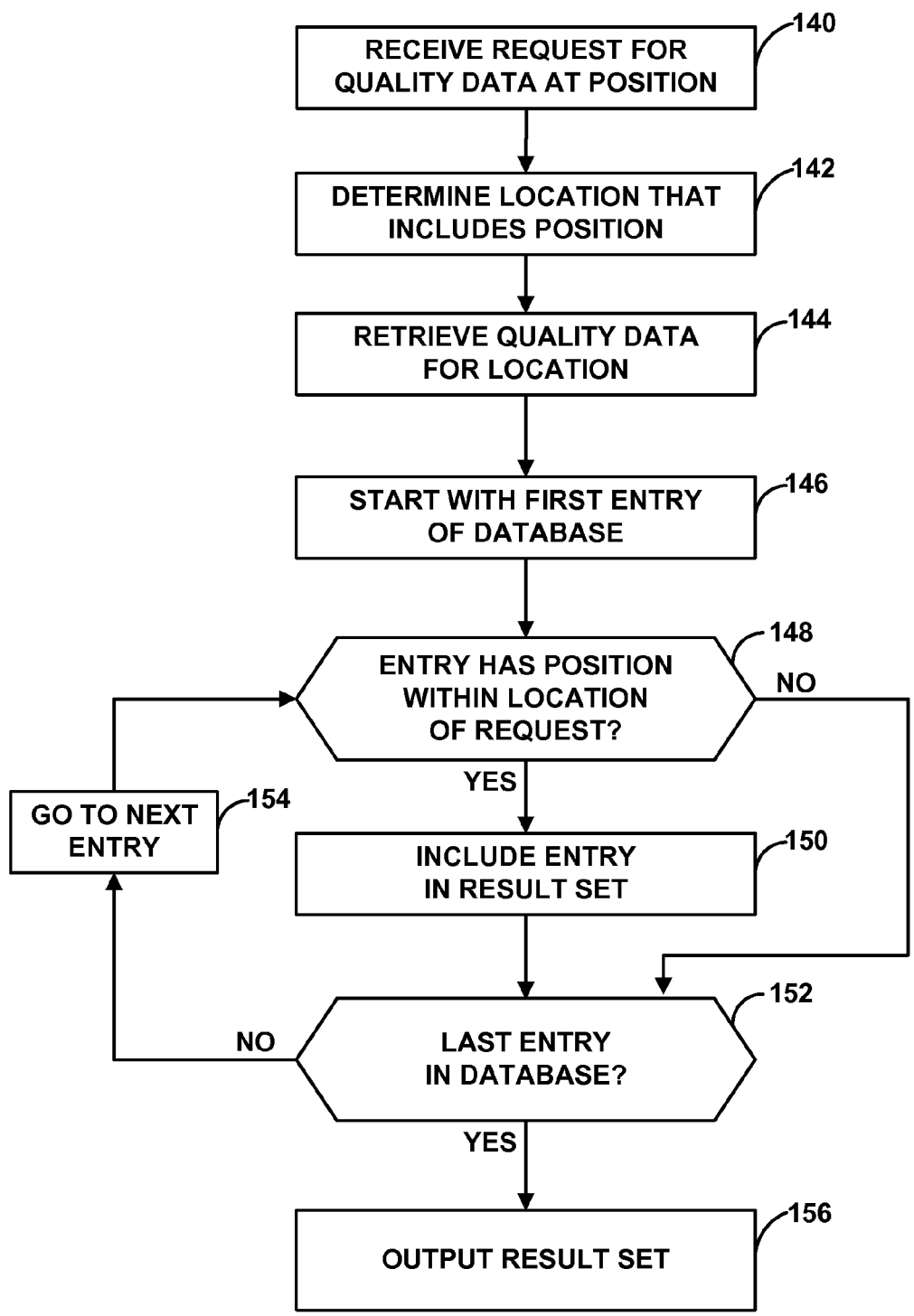
FIG. 7 is a flowchart illustrating an example method for providing aggregate signal quality data in response to a request for signal quality data at a particular geographical position.

FIG. 7 is a flowchart illustrating an example method for providing aggregate signal quality data in response to a request for signal quality data at a particular geographical position. The method of FIG. 7 may be performed, for example, by data repository 16, database server 30, data repository 52, or any system or device that stores signal quality data for various locations. For purposes of example, the method of FIG. 7 is described with respect to database server 30.

Initially, database server 30 may receive a request for signal quality data at a particular geographical position (140). For example, database server 30 may receive the request via one of network interfaces 40. The request may specify a geographical location, e.g., in a GPS format. In some examples, the request may specify a postal address format. In such examples, control unit 32 may execute a function to convert the geographical location in the postal address format to a GPS format. For example, control unit 32 may determine a GPS-format position value for the postal address format value based on a mapping program, such as Google Earth or Google Maps, that includes the ability to retrieve addresses and GPS format geographical position values.

The request may be structured in the form of a database query, such as an SQL query. For example, the request may be structured according to the format "SELECT-FROM-WHERE," where the SELECT clause indicates columns from which to retrieve data, the FROM clause indicates a table from which to retrieve data, and the WHERE clause specifies criteria for extracting data, such as that the geographical position of the request is between geographical positions defining boundaries for a location.

In some examples, database server 30 may receive a request not in the form of an SQL query, but then construct an SQL query based on the request to retrieve data from database 44 for the request. For example, the request may specify a geographical position {X, Y} where X represents a latitude element and Y represents a longitude element. Query engine 38 may identify a location having boundaries that encompass the geographical position of the request. For example, query engine 38 may determine a location having a northern boundary NB that is to the north of X, a southern boundary SB that is to the south of X, an eastern boundary EB that is to the east of Y, and a western boundary WB that is to the west of Y.

Query engine 38 may then construct a query such as, for example, "SELECT * FROM SigQualityTable WHERE ((NB>XPOS) AND (SB<XPOS) AND (EB<YPOS) AND (WB>YPOS))." In this example query, "SELECT *" indicates that data from all columns should be extracted, "FROM SigQualityTable" refers to a table named SigQualityTable that stores, e.g., signal quality values. "WHERE ((NB>XPOS) AND (SB<XPOS) AND (EB<YPOS) AND (WB>YPOS))" identifies entries satisfying the criteria that the northern boundary of the location is greater than the latitude value (XPOS) for the entry, that the southern boundary of the location is less than the latitude value for the entry, that the eastern boundary of the location is less than the longitude value (YPOS) for the entry, and the western boundary of the location is greater than the longitude value for the entry. Accordingly, this example query may cause query engine 38 to extract all entries having a geographical position value within the boundaries defined for a location that includes the geographical position of the request.

Query engine 38 may execute the request to retrieve a geographical position value from the request. Query engine 38 may further determine a location that includes the geographical position of the request (142), e.g., by interacting with location management module 36. That is, query engine 38 may determine a location having a geographical area in which the geographical position of the request is present. For example, query engine 38 may determine boundaries of the location, where the boundaries may be defined as geographical positions, and determine whether the geographical position of the request is between the boundaries defined for the location.

Query engine 38 may then retrieve entries of database 44 having geographical positions within the determined location that includes the geographical position of the request (144). That is, for each entry of database 44, query engine 38 may determine whether a geographical position of the entry is within the location determined to include the geographical position of the request. In the example of FIG. 7, query engine 38 starts with a first entry of database 44 (146) and determines whether a geographical position value for the entry is within the location for the request (148).

When the entry has a position value within the location for the request ("YES" branch of 148), query engine 38 includes data from the entry in a result set (150), e.g., a set of data to be returned to the requester. The result set generally includes data from entries of database 44 having geographical positions within the location determined to include the geographical position of the request. On the other hand, when the entry does not have a position value within the determined location ("NO" branch of 148), query engine 38 determines whether the current entry is the last entry of database 44 (152).

When the current entry is not the last entry of database 44 ("NO" branch of 152), query engine 38 moves to a next entry of database 44 (154), determines whether this entry has a geographical position within the location (148), and if so, includes data from the entry in the result set (150). On the other hand, when the current entry is the last entry of database 44 ("YES" branch of 152), database server 30 may output the result set via one of network interfaces 40 to return the result set to a requesting device (156).

Figure 8:
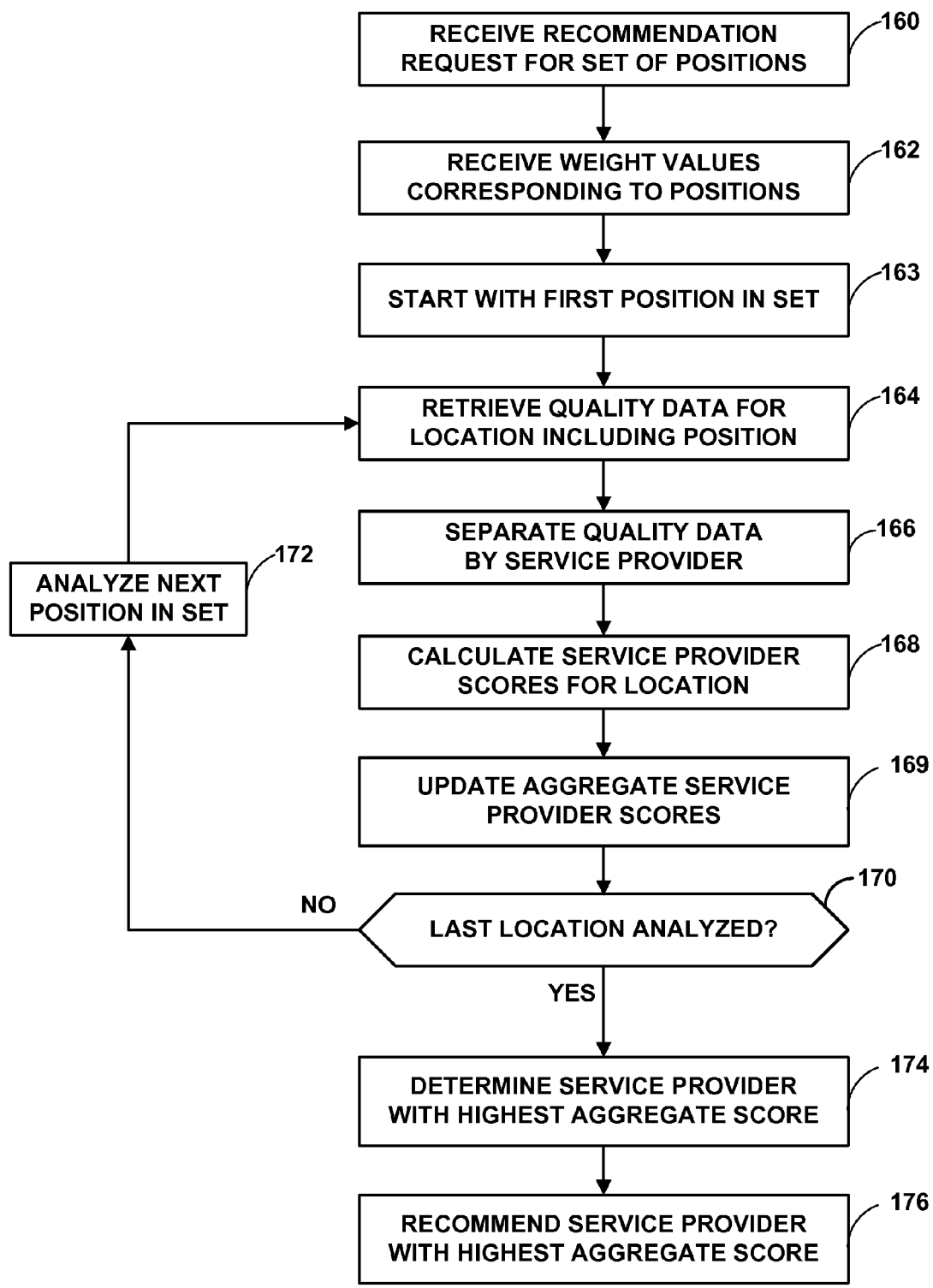
FIG. 8 is a flowchart illustrating an example method for recommending a service provider based on one or more geographical positions and corresponding weighting values.

FIG. 8 is a flowchart illustrating an example method for recommending a service provider based on one or more geographical positions and corresponding weighting values. The example method of FIG. 8 may be performed by a computing device in communication with a data repository or a database server that stores signal quality values for a plurality of geographical positions within various locations. For purposes of example, the method of FIG. 8 is described with respect to recommendation server 60 (FIG. 4).

Initially, recommendation server 60 receives a service provider recommendation request, e.g., from client device 54 (160). The request may include one or more geographical positions, e.g., representing areas frequented by a user providing the recommendation or areas where the user desires to have a relatively high signal quality value. The request may further include weight values corresponding to the geographical position values (162). As noted above, client device 54 may correspond to a mobile device, such as one of mobile devices 12. Client device 54 may therefore be configured to automatically include geographic position values in the request based on a period of time client device 54 spends in the geographic positions corresponding to the geographic position values. The weightings may further reflect the amount of time spent in the respective geographic positions.

Starting with the first geographical position of the request (163), criteria calculator 66 may retrieve signal quality data for a location including the geographical position (164). That is, criteria calculator 66 may determine a location that includes the geographical position, and then request signal quality data for the location from data repository 52. In some examples, rather than determining the location, criteria calculator 66 may request signal quality data near the geographical position of the request, and data repository 52 may determine a location including the geographical position to return signal quality data for the location to recommendation server 60. Criteria calculator 66 may request only signal quality data that also includes an indication of a service provider corresponding to the data from data repository 52.

Criteria calculator 66 separates the signal quality data for a location into groups based on respective service providers (166). That is, for each service provider, criteria calculator 66 may determine which portion of the retrieved data for the current location corresponds to the service provider. Criteria calculator 66 may then calculate a score for each service provider at the current location (168). For example, criteria calculator 66 may aggregate the service quality scores for a service provider at the location and multiply this aggregated service quality score by the weight value corresponding to the location. Criteria calculator 66 may then update an aggregate score for each service provider based on the service provider scores calculated for the current location (169).

Criteria calculator 66 then determines whether the current location is the last location (that is, the last requested geographical position) to be analyzed (170). When more geographical positions remain to be analyzed for the request ("NO" branch of 170), criteria calculator 66 repeats steps 164-169 for the next geographical position in the request (172). On the other hand, after all geographical positions have been analyzed ("YES" branch of 170), criteria calculator 66 determines which of the service providers has the highest aggregate score (174). Recommendation server 60 may then recommend the service provider having the highest aggregate score (176). Recommendation server 60 may also provide an indication of rankings of the service providers in order of aggregate score, as well as an indication of the aggregate scores for each service provider. In some examples, recommendation server 60 may provide the recommendation of the service provider to the mobile device that provided the geographic position values in the request to recommendation server 60. In this manner, recommendation server 60 may provide the recommendation directly to the mobile device for which a service provider recommendation is being sought.

The following pseudocode provides an example implementation for determining a service provider (abbreviated "SP" in the pseudocode) to recommend based on a set of geographic positions deemed important by a user and a set of corresponding weights of importance. The pseudocode below provides an example implementation of the method of FIG. 8. Instructions corresponding to the pseudocode may be encoded in a computer-readable storage medium and executed by a processing unit of a computing device.

```
int recommendSP(LocationSet locations, WeightSet weights) {
    float SPScore[numServiceProviders];
    for (int i=0; i < sizeOf(locations); i++) {
        for (int j=0; j<numServiceProviders; j++) {
            SPScore[j] += getAggStrength(j, locations[i]) * weights[i];
        }
    }
    int SPWithMaxScore = 0;
    float maxScore = SPScore[0];       // set default max score to the
                                       // first service provider
    for (int i=1; i<numServiceProviders; i++) {
        if (SPScore[i] > maxScore) {
            maxScore = SPScore[i];
            SPWithMaxScore = i;
        }
    }
    return SPWithMaxScore;
}
```

The pseudocode above provides a function "recommendSP" that receives a set of locations "locations" and a set of corresponding weights "weights" as arguments and returns an integer, corresponding to one of a plurality of service providers. It is assumed, for the purpose of this example, that each service provider is enumerated in a particular order. The pseudocode above calculates an array of floating point values for the service providers (SPScore[ ]), such that an entry in the array corresponds to the score for a particular service provider. The pseudocode iterates through each location and each service provider to update a score for the service provider at the location. In this example, the updating of the score includes adding the original value of the service provider's score to the aggregate strength of the service provider at the location, multiplied by the weight corresponding to the location.

After calculating scores for each of the service providers, the pseudocode determines which of the scores is highest, and which of the service providers has the highest score. In this example, the pseudocode iterates through the scores for each of the service providers and compares the service provider's score to a maximum score. When the current service provider's score is higher than the maximum score, the pseudocode updates the maximum score and an identifier of the service provider that has the maximum score. Finally the pseudocode returns the identifier of the service provider with the maximum score, to provide a service provider recommendation.

In some examples, particular values described in the pseudocode may be implemented as software objects, that is, data structures having member functions and member data. For example, a location may be implemented as an object having member data defining geographical boundaries of the location, a size (e.g., geographical area) of the location, and an aggregate signal quality value for the location. The location object may include member functions for retrieving and/or setting the values for the member data, as well as to calculate or update the value of the signal quality value for the location based on a new signal quality value corresponding to a geographical position that lies within the boundaries for the location. The location object may further include a member function for determining whether a geographical position is within the location. An array, linked list, or other data structure may also be used to store a set of location objects.

In addition to the criteria described above, recommendation server 60 may evaluate an average data transfer rate in each of the locations for each of the service providers, coverage percentage over a region including a plurality of locations, and a number of "holes" in a coverage area, where a "hole" may be defined as a transition between an area with coverage to one without in the user's travel patterns. Recommendation server 60 may also evaluate other criteria including, for example, a price range for a device and/or service plan, carriers to be avoided, minimum capabilities of a device (e.g., requirements that the device must have a camera or a physical keyboard), or other such constraints.

Recommendation server 60 may exclude service providers from the results that do not conform to these constraints, or may reduce a score or ranking in a result set for the service providers that do not conform to the constraints. In some examples, a user may subscribe to updates from recommendation server 60, such that if the recommendation provided by recommendation server 60 were to change, recommendation server 60 may alert the user with a new recommendation. In some examples, a client device, such as client device 54, may be configured to perform a method similar to that described with respect to FIG. 8 to pull data directly from data repository 52 and provide a service provider recommendation.

Figure 9:
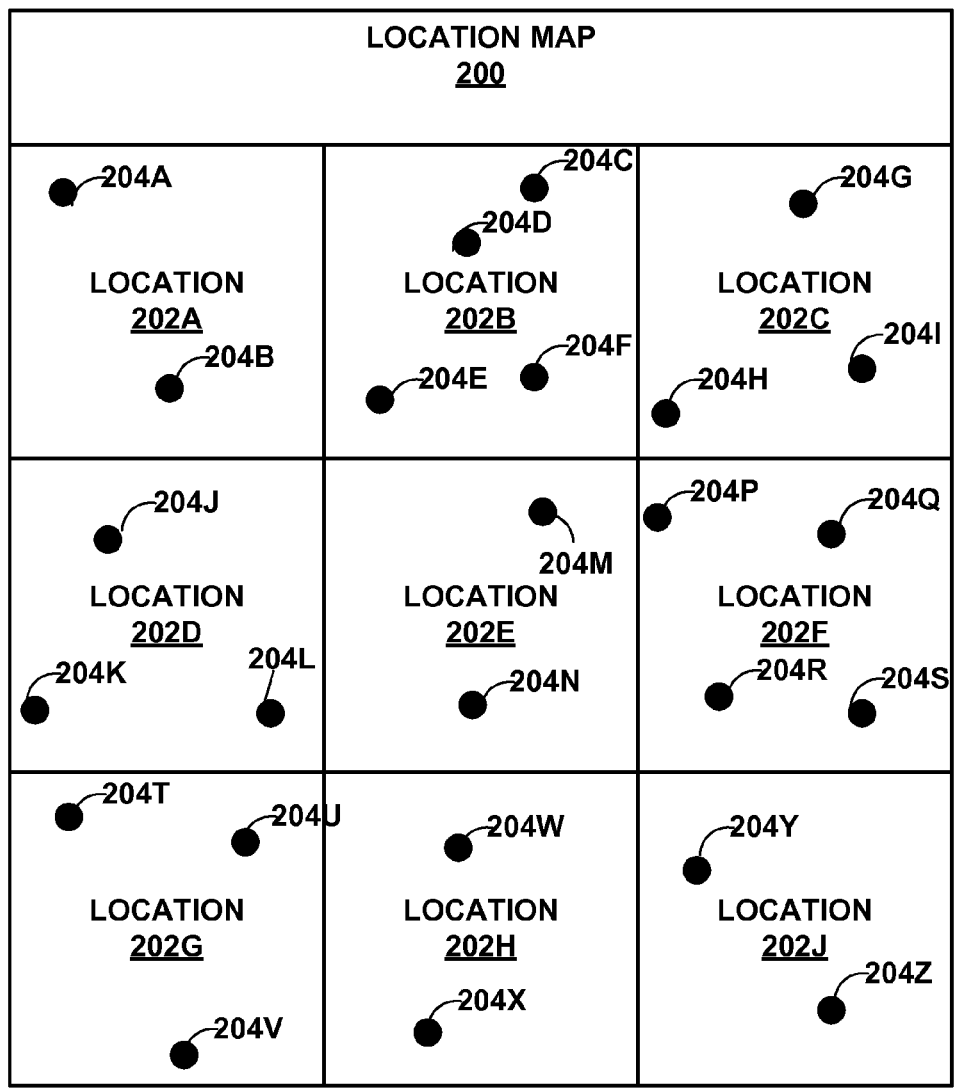
FIG. 9 is a conceptual diagram illustrating relationships between locations and geographical positions.

FIG. 9 is a conceptual diagram illustrating relationships between locations and geographical positions. The example diagram of FIG. 9 illustrates location map 200, which includes locations 202A-202J (locations 202). In the example of FIG. 9, each of locations 202 has the same size, although in other examples, one or more of the locations 202 may have different sizes, or each location may have its own individual size.

Locations 202 each include a number of geographical positions 204A-204Z (geographical positions 204). Each of geographical positions 204 occurs within a respective one of locations 202. In general, a geographical position occurs within a location when the geographical position is surrounded by defined borders of the location. Thus, for example, geographical positions 204A and 204B are within location 202A, while geographical positions 204C, 204D, 204E, 204F are within location 202B.

Figure 10:
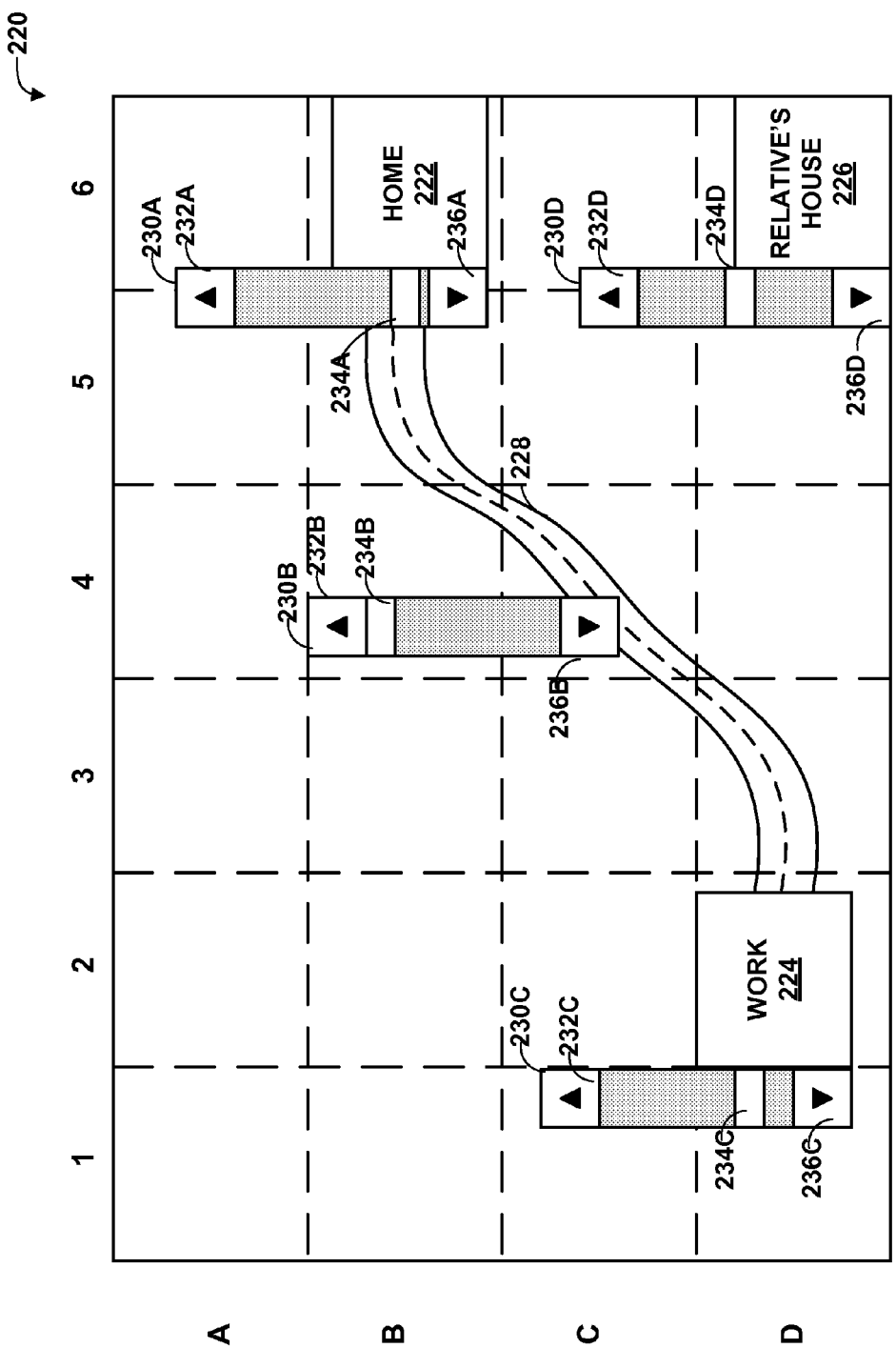
FIG. 10 is a conceptual diagram illustrating an example user interface by which a user may select one or more geographical positions and assign corresponding weight values to the geographical positions.

FIG. 10 is a conceptual diagram illustrating an example user interface 220 by which a user may select one or more geographical positions and assign corresponding weight values to the geographical positions. The geographical positions in the particular example of FIG. 10 include home 222, work 224, and relative's house 226. Path 228, which may represent a road, sequence of roads, railroad, or other path, includes a number of geographical positions. Client device 54 may be equipped with a display that presents user interface 220 and an input device, such as, for example, a keyboard, mouse, stylus, light pen, and/or touch screen, for receiving input from user 56.

Each of the geographical positions selected in the example of FIG. 10 lies within a particular location, where boundaries of the locations are represented by dashed lines in the example of FIG. 10. In the example of FIG. 10, locations are identified by a row value ("A," "B," "C," or "D,") and a column value ("1" through "6"). For example, home 222 lies within location B6, work 224 lies within location D2, and relative's house 226 lies within location D6. Path 228 crosses a number of locations, including locations B5, B4, C4, D4, C3, D3, and D2.

User interface 220 also enables the user to assign weights to each geographical position (or set of associated geographical positions, in the case of road 228). User interface 220 may present one of scroll bars 230A-230D (scroll bars 230) in association with each geographical position. In the example of FIG. 6, scroll bar 230A is associated with home 222, scroll bar 230B is associated with path 228, scroll bar 230C is associated with work 224, and scroll bar 230D is associated with relative's house 226.

Each of scroll bars 230 includes an up arrow, a down arrow, and a slider. For example, scroll bar 230A includes up arrow 232A, down arrow 236A, and slider 234A. When a user selects up arrow 232A (e.g., using a pointer controlled by a mouse), slider 234A moves up scroll bar 230A, and when the user selects down arrow 236A, slider 234A moves down scroll bar 230A. The user may also select slider 234A with the pointer and move slider 234A along scroll bar 23A.

In general, the position of the slider of a scroll bar is indicative of a weight set by the user for the corresponding geographical position. For example, each scroll bar may have a range of values between 1 and 100. Slider 234A may represent a value of 5 for home 222. Slider 234B may represent a value of 100 for path 228. Slider 234C may represent a value of 15 for work 224. Slider 234D may represent a value for relative's house 226.

In some examples, the recommendation server may modify scores based on various criteria. For example, recommendation server may attempt to identify coverage "holes" along path 228. A hole may correspond to a location along a frequently traveled route, such as path 228, that does not have connectivity or has intermittent data transfer failures. The recommendation engine may automatically adjust the weight for such a location to bias the recommendation in favor of a service provider that does not have holes along a path or has the fewest holes along the path. For example, if a first service provider has a hole at location C4 in FIG. 10, but has very good signal quality values for the other locations including path 228, while a second service provider has no holes along path 228 but relatively lower signal quality along path 228, recommendation server may nevertheless recommend the second service provider, due to the lack of holes along path 228.

After a user has selected geographical positions and set corresponding weight values, user interface 220 may pass the geographical positions and corresponding weight values to an application. The application may package the geographical positions and corresponding weight values into a request for a service provider recommendation and send the request to a recommendation server. For locations corresponding to the geographical positions, the recommendation server may determine available service providers and calculate signal quality scores for the service providers at the locations, as well as an aggregate service provider score for each service provider. The recommendation server may then provide a recommendation of a service provider to the user based on the geographical positions and the weights selected by the user.

Although recommendation server 60 is described above as "pulling" data on demand (that is, requesting data when data is desired), in another example, data repository 52 may "push" data to recommendation server 60 when new data becomes available. This may approximate real-time data collection and analysis. As another alternative example, any form of geographic information may be used to approximate the geographic position occurred, e.g., cell tower information, user activities that provide indications of the geographic position (e.g., queries submitted by the user), applications executed by the user, or other such information. The functionality of data repository 16 may, in some examples, be implemented by separate, communicatively coupled computing devices, e.g., by having dedicated devices for storing data, mining the data, serving the data, and other dedicated devices.

In some examples, such as where a mobile device provides an application programming interface (API) for making and/or receiving calls with information about, for example, transfer rates, dropped calls, or other call information, a system may gather information regarding voice signal quality data in addition to the examples discussed in this disclosure regarding data signal quality. For example, the Google Voice application may be used to collect and distribute voice signal quality data to a central data repository.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
   receiving a request for a service provider recommendation, the request comprising a first geographic position value, a second, different geographic position value, a first weight value corresponding to the first geographic position value, and a second weight value corresponding to the second geographic position value, wherein the service provider recommendation comprises a recommendation for a provider of a wireless service for a mobile device;
   determining aggregate signal quality values for service providers at a first location, the first location including a first geographic position corresponding to the first geographic position value;
   determining aggregate signal quality values for service providers at a second location, the second location including a second geographic position corresponding to the second geographic position value;
   determining, by at least one computing device, scores for the service providers at the first location and the second location based on signal quality values for the service providers at the first location and the second location, including applying the first weight value to the aggregate signal quality values for the service providers at the first location and applying the second weight value to the aggregate signal quality values for the service providers at the second location; and
   outputting the service provider recommendation comprising an identification of a service provider having the highest score out of the service providers.

2. The method of claim 1, further comprising, before receiving the request for the service provider recommendation:
   receiving data sets from a plurality of mobile devices, each of the data sets comprising a geographic position value for a corresponding one of the plurality of mobile devices, an identification of a service provider for the corresponding one of the plurality of mobile devices, and a value representative of signal quality for the corresponding one of the plurality of mobile devices at the corresponding geographic position; and
   storing the data sets.

3. The method of claim 2, further comprising determining which of the service providers has the highest score by:
   aggregating values for the first location by aggregating the values representative of signal quality of those of the data sets determined to have geographic position values within the first location to produce aggregate values for the service providers at the first location;
   aggregating values for the second location by aggregating the values representative of signal quality of those of the data sets determined to have geographic position values within the second location to produce aggregate values for the service providers at the second location;
   determining the scores for the service providers based on a combination of the aggregate signal quality values for the service providers at the first location and the aggregate signal quality values for the service providers at the second location; and
   determining which of the service providers has the highest score based on the combination.

4. The method of claim 1, wherein receiving the request comprises receiving the request from a mobile device that automatically includes in the request the first geographic position value based on a first amount of time spent by the mobile device at the first location and the second geographic position value based on a second amount of time spent by the mobile device at the second location.

5. The method of claim 4, wherein outputting the service provider recommendation comprises outputting the service provider recommendation to the mobile device, wherein the recommendation comprises a recommendation of a service provider for the mobile device.

6. The method of claim 1, wherein the request further comprises a constraint for a mobile device, the method further comprising:
   determining whether mobile devices sold by the service providers satisfy the constraint; and
   reducing the scores of one or more of the service providers when mobile devices sold by the one or more service providers do not satisfy the constraint.

7. The method of claim 1, wherein the request further comprises a constraint on a service provider pricing plan, the method further comprising:
   determining whether the service providers satisfy the constraint; and
   reducing the scores of one or more of the service providers when pricing plans offered by the one or more service providers do not satisfy the constraint.

8. A non-transitory computer-readable storage medium encoded with instructions for causing a programmable processor to:
   receive a request for a service provider recommendation, the request comprising a first geographic position value, a second, different geographic position value, a first weight value corresponding to the first geographic position value, and a second weight value corresponding to the second geographic position value, wherein the service provider recommendation comprises a recommendation for a provider of a wireless service for a mobile device;
   determine aggregate signal quality values for service providers at a first location, the first location including a first geographic position corresponding to the first geographic position value;
   determine aggregate signal quality values for service providers at a second location, the second location including a second geographic position corresponding to the second geographic position value;
   determine scores for the service providers at the first location and the second location based on signal quality values for the service providers at the first location and the second location, including applying the first weight value to the aggregate signal quality values for the service providers at the first location and applying the second weight value to the aggregate signal quality values for the service providers at the second location; and
   output the service provider recommendation comprising an identification of a service provider having the highest score out of the service providers.

9. The non-transitory computer-readable storage medium of claim 8, further comprising instructions that cause the processor to, before receiving the request for the service provider recommendation:
   receive data sets from mobile devices, each of the data sets comprising a geographic position value for a corresponding one of the mobile devices, an identification of a service provider for the corresponding one of the mobile devices, and a value representative of signal quality for the corresponding one of the mobile devices at the corresponding geographic position; and
   store the data sets.

10. The non-transitory computer-readable storage medium of claim 9, further comprising instructions to determine which of the service providers has the highest score by causing the processor to:
   aggregate values for the first location by aggregating the values representative of signal quality of those of the data sets determined to have geographic position values within the first location to produce aggregate values for the service providers at the first location;
   aggregate values for the second location by aggregating the values representative of signal quality of those of the data sets determined to have geographic position values within the second location to produce aggregate values for the service providers at the second location;
   determine the scores for the service providers based on a combination of the aggregate values for the service providers at the first location and the aggregate values for the service providers at the second location; and
   determine which of the service providers has the highest score based on the combination.

11. The non-transitory computer-readable storage medium of claim 8, wherein the instructions to receive the request comprise instructions to receive the request from a mobile device that automatically includes in the request the first geographic position value based on a first amount of time spent by the mobile device at the first geographic position and the second weight value based on a second amount of time spent at the second geographic position.

12. The non-transitory computer-readable storage medium of claim 11, wherein the instructions to output the service provider recommendation comprise instructions to output the service provider recommendation to the mobile device, wherein the recommendation comprises a recommendation of a service provider for the mobile device.

13. The non-transitory computer-readable storage medium of claim 8, wherein the request further comprises a constraint for a mobile device, further comprising instructions to:
   determine whether mobile devices sold by the service providers satisfy the constraint; and
   reduce the scores of one or more of the service providers when mobile devices sold by the one or more service providers do not satisfy the constraint.

14. The non-transitory computer-readable storage medium of claim 8, wherein the request further comprises a constraint on a service provider pricing plan, further comprising instructions to:
   determine whether the service providers satisfy the constraint; and
   reduce the scores of one or more of the service providers when pricing plans offered by the one or more service providers do not satisfy the constraint.

15. A device comprising:
   a first interface configured to receive a request for a service provider recommendation, the request comprising a first geographic position value, a second, different geographic position value, a first weight value corresponding to the first geographic position value, and a second weight value corresponding to the second geographic position value, wherein the service provider recommendation comprises a recommendation for a provider of a wireless service for a mobile device;
   one or more processors configured to: determine aggregate signal quality values for service providers at a first location, the first location including a first geographic position corresponding to the first geographic position value, determine aggregate signal quality values for service providers at a second location, the second location including a second geographic position corresponding to the second geographic position value, determine scores for the service providers based on signal quality values for the service providers at the first location and the second location, and construct the service provider recommendation comprising an identification of the service provider having the highest score, including apply the first weight value to the aggregate signal quality values for the service providers at the first location and applying the second weight value to the aggregate signal quality values for the service providers at the second location; and a second interface configured to output the service provider recommendation.

16. The device of claim 15, wherein one or more processors is configured to aggregate values for the first location by aggregating the values representative of signal quality of those of the data sets determined to have geographic position values within the first location to produce aggregate values for the service providers at the first location, aggregating values for the second location by aggregating the values representative of signal quality of those of the data sets determined to have geographic position values within the second location to produce aggregate values for the service providers at the second location, determining the scores for the service providers based on a combination of the aggregate signal quality values for the service providers at the first location and the aggregate signal quality values for the service providers at the second location, and determining which of the service providers has the highest score based on the combination.

* * * * *